US 9,460,375 B2

(12) United States Patent
Bayona et al.

(10) Patent No.: US 9,460,375 B2
(45) Date of Patent: Oct. 4, 2016

(54) MANAGING PRINTER DRY TIME

(75) Inventors: Maria Isabel Borrell Bayona, Sant Cugat del Valles (ES); Luis Garcia Garcia, Sant Cugat del Valles (ES); Sergio Puigardeu Aramendia, Sant Cugat del Valles (ES); Angel Martinez Barambio, Sant Cugat del Valles (ES)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 65 days.

(21) Appl. No.: 14/119,089

(22) PCT Filed: Jun. 1, 2011

(86) PCT No.: PCT/US2011/038743
§ 371 (c)(1),
(2), (4) Date: Nov. 20, 2013

(87) PCT Pub. No.: WO2012/166133
PCT Pub. Date: Dec. 6, 2012

(65) Prior Publication Data
US 2014/0092400 A1 Apr. 3, 2014

(51) Int. Cl.
G06F 3/12 (2006.01)
G06K 15/00 (2006.01)
G06K 15/02 (2006.01)
H04N 1/60 (2006.01)
H04N 1/403 (2006.01)
G06K 15/10 (2006.01)
G06K 15/16 (2006.01)

(52) U.S. Cl.
CPC ........... G06K 15/407 (2013.01); G06K 15/102 (2013.01); G06K 15/16 (2013.01); G06K 15/1868 (2013.01)

(58) Field of Classification Search
CPC ....... B41J 2/1755; B41J 2/17546; B41J 2/00

USPC ............ 358/3.28, 1.12, 1.16; 347/86, 9
See application file for complete search history.

(56) References Cited

U.S. PATENT DOCUMENTS

| | | | | | |
|---|---|---|---|---|---|
| 4,469,026 A | * | 9/1984 | Irwin | ................ | B41F 23/0443 101/232 |
| 4,532,554 A | * | 7/1985 | Skala | ...................... | B41J 2/005 348/552 |
| 5,714,990 A | * | 2/1998 | Courtney | .................. | B41J 2/17 347/102 |
| 5,784,090 A | * | 7/1998 | Selensky | ................ | B41J 11/002 347/102 |
| 6,457,801 B1 | * | 10/2002 | Fish | ........................ | B41J 29/393 347/19 |
| 6,550,883 B2 | * | 4/2003 | Oriol | ...................... | B41J 2/04553 347/14 |
| 6,598,087 B1 | * | 7/2003 | Dixon, III | ............. | G06F 3/1209 358/1.15 |
| 7,440,943 B2 | * | 10/2008 | Grasso | ............... | G06F 17/30011 707/713 |
| 8,358,426 B2 | * | 1/2013 | Morishita | .............. | B41J 2/1652 358/1.12 |

(Continued)

FOREIGN PATENT DOCUMENTS

| | | |
|---|---|---|
| JP | 2004/262171 A | 9/2004 |
| JP | 2007069530 | 3/2007 |

(Continued)

Primary Examiner — Akwasi M Sarpong
(74) Attorney, Agent, or Firm — Tarolli,Sundheim, Covell & Tummino

(57) ABSTRACT

One example includes a printer (110) having a calculator (120) to determine plot density of a printer content page (130). A controller (140) is provided to set a print parameter based on the determined plot density for the printer content page (130) to mitigate dry time for a printed output page (150).

20 Claims, 5 Drawing Sheets

(56) References Cited

U.S. PATENT DOCUMENTS

| | | | |
|---|---|---|---|
| 9,019,535 B1* | 4/2015 | Hansen | G06F 3/1203 358/1.13 |
| 2002/0023057 A1* | 2/2002 | Goodwin | G06Q 30/02 705/50 |
| 2002/0116291 A1* | 8/2002 | Grasso | G06F 17/30011 707/736 |
| 2003/0028650 A1* | 2/2003 | Chen | H04L 12/4641 709/229 |
| 2003/0081023 A1* | 5/2003 | Miller | B41J 2/15 347/9 |
| 2003/0152753 A1* | 8/2003 | Waller, Jr. | B41M 5/52 428/195.1 |
| 2004/0066435 A1* | 4/2004 | Lester | B41J 2/1755 347/86 |
| 2006/0192985 A1* | 8/2006 | Shen | G06F 3/1204 358/1.13 |
| 2006/0238594 A1* | 10/2006 | Tham | B41J 3/60 347/104 |
| 2008/0204808 A1 | 8/2008 | Miller et al. | |
| 2009/0094604 A1* | 4/2009 | Sakai | G06F 3/1204 718/1 |
| 2009/0237728 A1* | 9/2009 | Yamamoto | G06F 3/1454 358/1.15 |
| 2009/0266258 A1 | 10/2009 | Reichelsheimer et al. | |
| 2010/0202024 A1* | 8/2010 | Carey | G05B 19/41865 358/3.28 |
| 2011/0058207 A1* | 3/2011 | Morishita | B41J 2/1652 358/1.14 |
| 2012/0102317 A1* | 4/2012 | Mathur | G06F 21/10 713/156 |

FOREIGN PATENT DOCUMENTS

| | | | |
|---|---|---|---|
| JP | 2007175980 | | 7/2007 |
| JP | 2007175980 A | * | 7/2007 |
| JP | 2010188677 | | 9/2010 |
| KR | 10-2005/0061763 A | | 6/2005 |

* cited by examiner

MANAGING PRINTER DRY TIME

BACKGROUND

In computing, a printer is a peripheral which produces a text and/or graphics of documents stored in electronic form, usually on physical print media such as paper or transparencies. Many printers are utilized as local peripherals, and are attached to a computer which serves as a document source. In addition, some printers can directly interface to electronic media such as memory cards, or to image capture devices such as digital cameras, scanners, where some printers are combined with a scanners and/or fax machines in a single unit, and can function as photocopiers.

DETAILED DESCRIPTION

Figure 1:
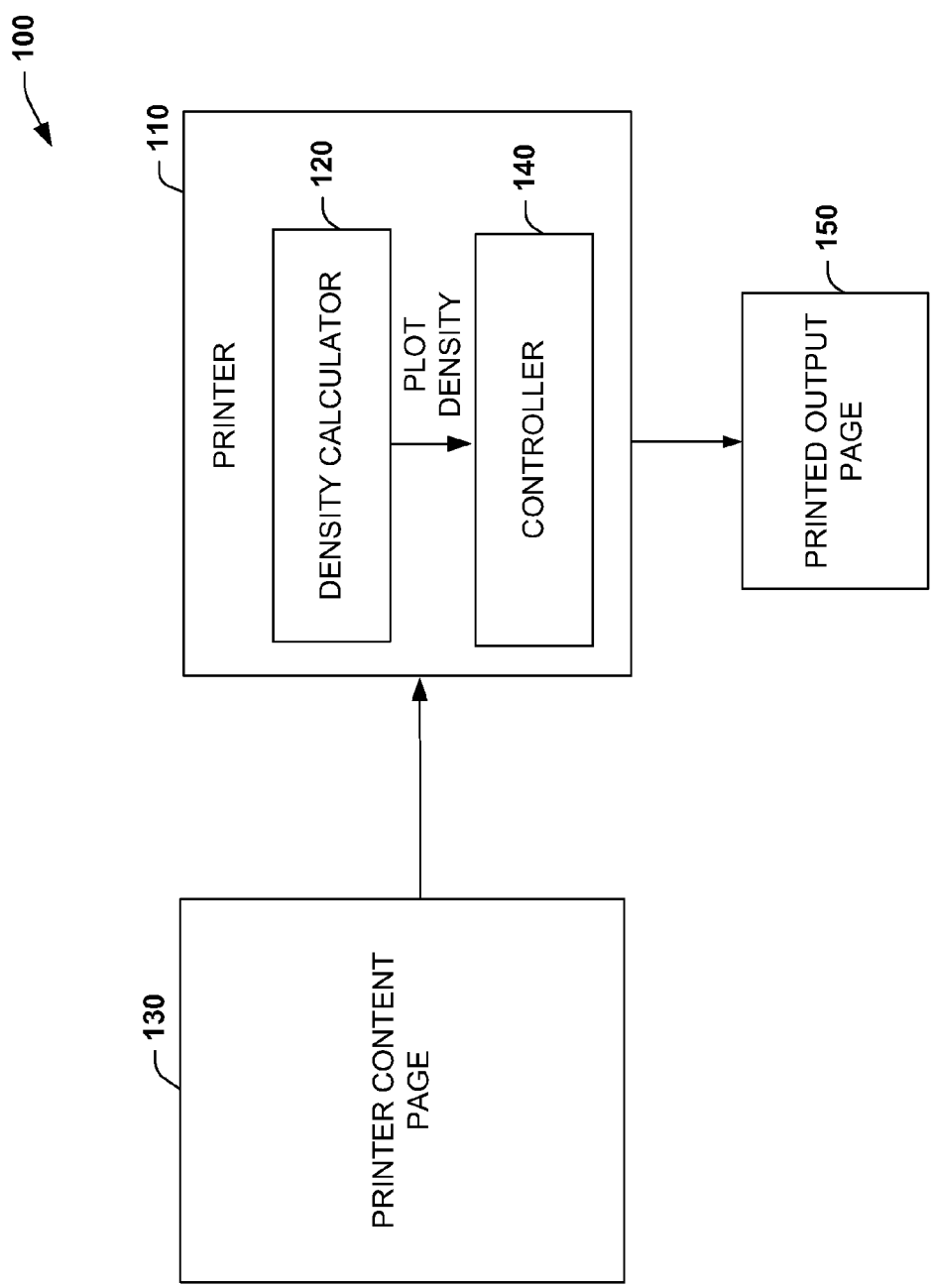
FIG. 1 illustrates an example of a printing system.

FIG. 1 illustrates an example of a printing system 100 that mitigates drying time for print jobs. The system 100 includes a printer 110 that includes a density calculator 120 to determine plot density of a printer content page 130. A controller 140 is provided to set a print parameter based on the determined plot density of the printer content page 130 and to mitigate dry time for a printed output page 150. The printer content page 130 is the content or data that is eventually output by the printer 110 as the printed output page 150, such as can be supplied by an external computer system (not shown). For example, the printed content page 130 can include several pages of data that is generated for a respective print job. Dry time processing and management can be performed on a per page basis as is disclosed herein.

Generally, dry time is the time that ink on a media, such as the printed output page 150, has to substantially dry in order that any later manipulation will not cause Image Quality (IQ) defects. Media with larger dry times are typically glossy, used in Graphic Artists (GA) applications and Natural Tracing papers widely used for CAD drawings. There are generally also two fundamental dry time variables, plot content and orientation, for example. The dry time policy used in many Large Format Printers, for example, is to pre-set a dry time amount regardless of the plot content or page orientation. Although users can manually select between three dry time levels, they generally lack the experience and knowledge needed to choose the correct dry time for a given image.

The system 100 is operative to automatically determine and set the dry time (e.g., time it takes to print one page or delay before beginning to print next page) depending on the plot content, its orientation, or other variables described herein. This allows reduced dry times and, in turn, reduces the probability of ink smearing, which can happen when dry times are too short (e.g., printing throughput exceeds time for ink to dry).

Dry time can be defined as the time that the ink on media needs to dry so that any later page manipulation will not cause image quality defects (e.g., ink smears). Since many inks are water-based, dry times are quite significant in some media. As noted previously, media with larger dry times are typically glossy ones, used in Graphic Artists applications and Natural Tracing papers used for CAD drawings.

Plot content is a consideration because the more ink fired or placed on media, the more time it will take the water to evaporate, and therefore the ink to dry. As an example, CAD drawings mostly containing lines will have lower dry times than graphic arts images containing area fills. On the other hand, plot orientation can also have an impact on dry time. Take for example, a gradient from white to 100% black printed on an A1 size glossy media. In this example, the area with a larger dry time will be the darkest part of the gradient since it contains more ink (e.g., a higher ink density). Thus, if the darkest part of the gradient is printed first, the ink in this area will already have dried by the time the plot is finished. Therefore, a very low dry time will be needed after the plot is finished. In contrast, if the darkest area is printed at the end of the plot for a given page, a longer dry time will be needed after the plot is finished as will be described herein with respect to FIGS. 3 and 4.

As noted previously, dry time policy used in many Large Format Printers is to set a default dry time amount regardless of the plot content or orientation. Although users can choose between two extra dry time levels, they generally lack the experience and knowledge needed to choose the correct dry time for a given image. Consequently, users may have to wait too long for proper dry times before they can receive their printouts. On the other hand, if the plot ink density is very high, it is possible that the default dry time in the printer is too short. In this case, when the printout falls into the basket, the ink can be smeared and the printout may have to be discarded. The system 100 automatically determines content density for a print page and sets a print parameter to reduce dry time. This can be implemented, for example, depending on the plot content, its orientation, and/or other print parameters described herein. Thus, the system 100 can reduce unnecessary dry times and mitigate the probability of ink smearing that occur when dry times are too short.

In one example, the printer 110 automatically calculates dry time taking into account the plot content and its orientation. Thus, at least two types of data are employed for such computations although other variables can be considered as will be described herein with respect to FIG. 2. The plot content variable is the amount of ink fired at each swath, where a swath is the travel of a print head from left to right (or right to left). Current Large Format Printers generally provide this data by using an embedded densitometer, for example, which can be employed as the density calculator 120. The densitometer analyzes image data from the printer content page 130 and determines the ink density for each swath. Ink density can be easily translated into an amount of dry time by using conversion tables that can be determined experimentally for a given media and ink type. With this data, it is then determined the amount of dry time utilized for the ink fired at each swath.

Another type of data utilized can be print time, such as including time at which each swath is printed and the overall time needed to print the whole plot at 150. This data collectively can be used to determine how much time is left for the ink at each swath to dry before the plot is finished. With at least these two pieces of data, it is straightforward to determine which is the swath requiring a longer dry time for a given orientation. Thus, if larger density swaths are detected near the end of a plot, the page can be rotated 180 degrees in order to allow more dry times for the higher density portions of the plot to dry while the rest of the plot remains to be printed.

As noted previously, the system 100 can include the calculator 120 to determine plot density of a printer content page 130 and the controller 140 to set a print parameter based on the determined plot density for the printer content page and to mitigate dry time for the printed output page 150. Another example of print parameter includes a page orientation, such as the page orientation is a 0 degree rotation, 90 degree rotation, a 180 degree rotation, or a 270 degree rotation, for example. The print parameter can also include a temperature, humidity or pressure, for example, as can be measured by corresponding measurement devices (e.g., thermometer, humidity sensor, or barometer). The controller 140 can also adjust a print head speed to control dry time as well as adjust a paper feed delay (e.g., delay between printing a next page) to control dry time, for example. For example, the controller 140 may hold a paper at the end of its feed before beginning the next page for printing. In another example, a density computation is determined for an amount of ink to be employed per swath of travel of an ink head.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributing among remote devices across a network as describe in more detail below with respect to FIG. 2.

Figure 2:
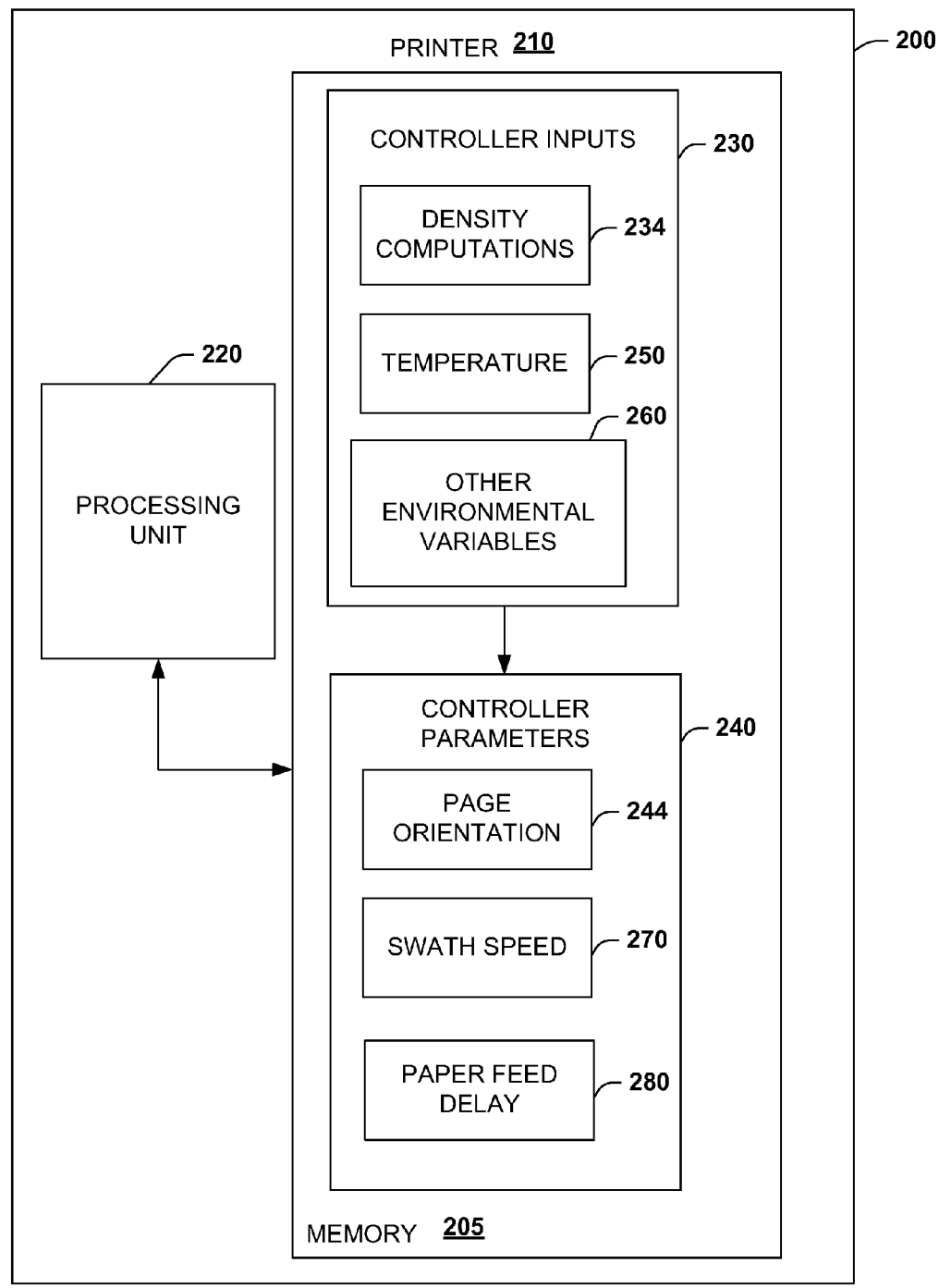
FIG. 2 illustrates an example of system parameters and inputs that can be implemented in a printing system.

FIG. 2 illustrates an example of system parameters and inputs for managing printer dry time. A system 200 provides a printer 210 having a memory 205 for storing computer executable instructions associated with a computer. For example, the memory 205 can include system memory as well additional memory devices. The memory 205 can store data, programs, instructions, database queries in text or compiled form, and any other machine readable data that can be utilized to operate the system 200 based on this disclosure herein. A processing unit 220 is provided for accessing the memory 205 and executing the computer executable instructions. The processing unit 220 can be a computing device and can include an application-specific integrated circuit (ASIC). The processing unit 220 executes a set of instructions to implement the operations of examples disclosed herein. The processing unit can include a processor core.

In the example of FIG. 2, the instructions include controller inputs 230. The controller inputs 230 provide density computations 234 that include data for an amount of ink to be employed per swath of travel of an ink head of the printer 210. A controller parameter 240 includes a variable page orientation 244 that can be set to adjust a printed page based on the density computations 234 (as well as other controller inputs 230) in order to facilitate throughput for the printer 210. The controller inputs 230 can include a temperature variable 250 and other environmental variables, such as humidity or pressure demonstrated at 260. In addition to page orientation, 244, the controller parameters 240 can include a swath speed 270 or a paper feed delay 280, for example. The processing unit 220 thus can perform a control function by adjusting one or more of the controller parameters 240 based on the controller inputs 230, as disclosed herein.

Figure 3:
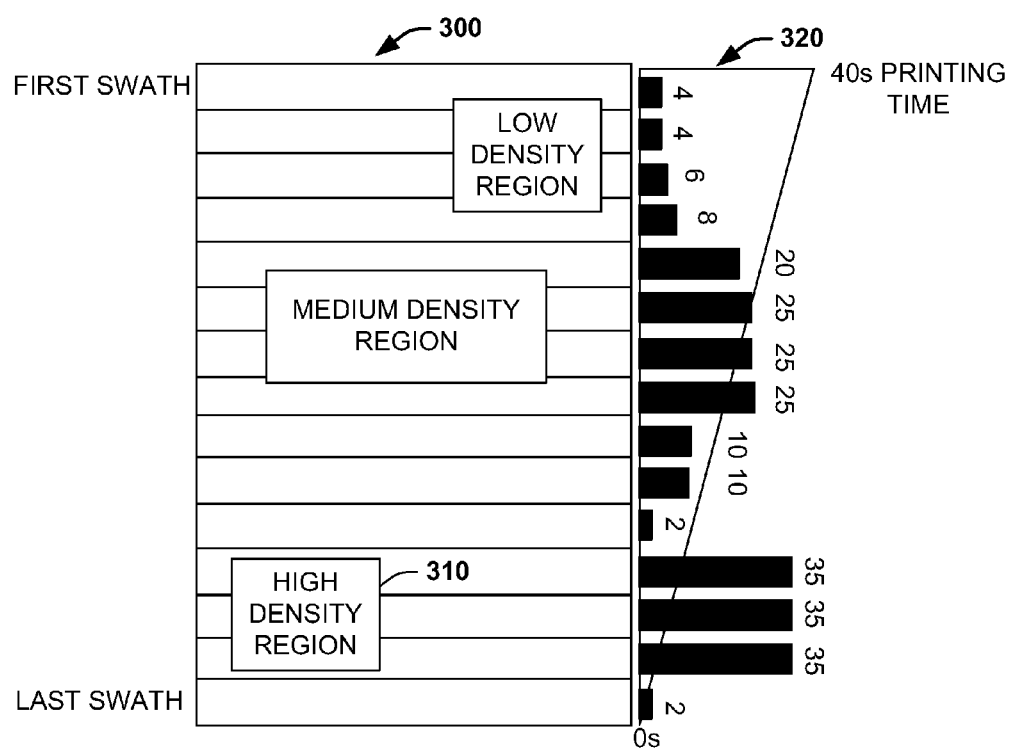
FIG. 3 illustrates an example of a printed page output having different ink densities across the page.
Figure 4:
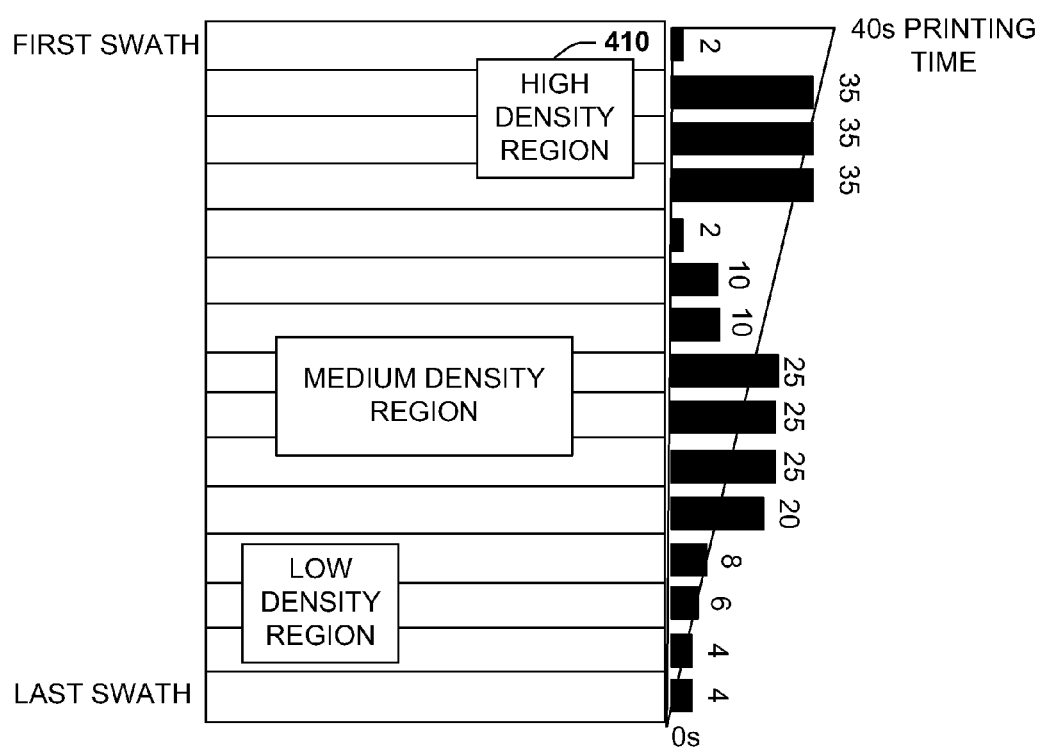
FIG. 4 illustrates an example of a printed page output having different ink densities across the page where the page is rotated 180 degrees from the example illustrated in FIG. 3.

FIGS. 3 and 4 collectively illustrate an example of how dry time can be reduced by adjusting page orientation. FIG. 3 provides a graphical example of a plot printed in Natural Tracing paper that takes 40 seconds to be printed. In the diagram, horizontal bars at 300 show the amount of dry time needed at each swath, where one swath is the travel of the print head from left to right across the page. As it can be observed, with the highest ink density region at 310, the highest the dry time is needed (e.g., about 35 seconds). On the other hand, a triangle 320 represents the time left before the plot is finished. From this triangle 320, it is possible to visually see the dry time left for the ink at each swath before the plot is finished. With this image page orientation depicted in FIG. 3, the dry time needed after completing the printing is very high (e.g., about 33 seconds due to the dry time for the high density region). This is because the swaths with highest ink densities at 310 are printed at the end of the plot.

In contrast, FIG. 4 shows the example if the image page orientation is rotated 180 degrees. In this case, the highest ink density swaths at 410 are printed at the beginning of the plot and therefore, they have more time to dry before the plot is finished. It is for this reason that the dry time that has to be applied after the plot is finished is much lower than with the previous orientation depicted in FIG. 3. From this example, it is advantageous for the printer (e.g., controller 140 of FIG. 1) to select the second orientation of FIG. 4 based on the computed plot density in order to reduce the dry time when the plot is printed.

The systems and methods described herein provide several advantages. In one example, it allows reducing dry time by analyzing image content and controlling a print parameter (e.g., choosing a page orientation) based on the analyzed image content. It is clear that this greatly increases overall printer throughput, which is a key vector in the value proposition of printers. Since the system and methods can reduce dry time for images, it minimizes the possibility of ink smearing. Ink smearing is frequent in current Large Format Printers whenever a high ink density image is printed and the dry time applied is not long enough.

Figure 5:
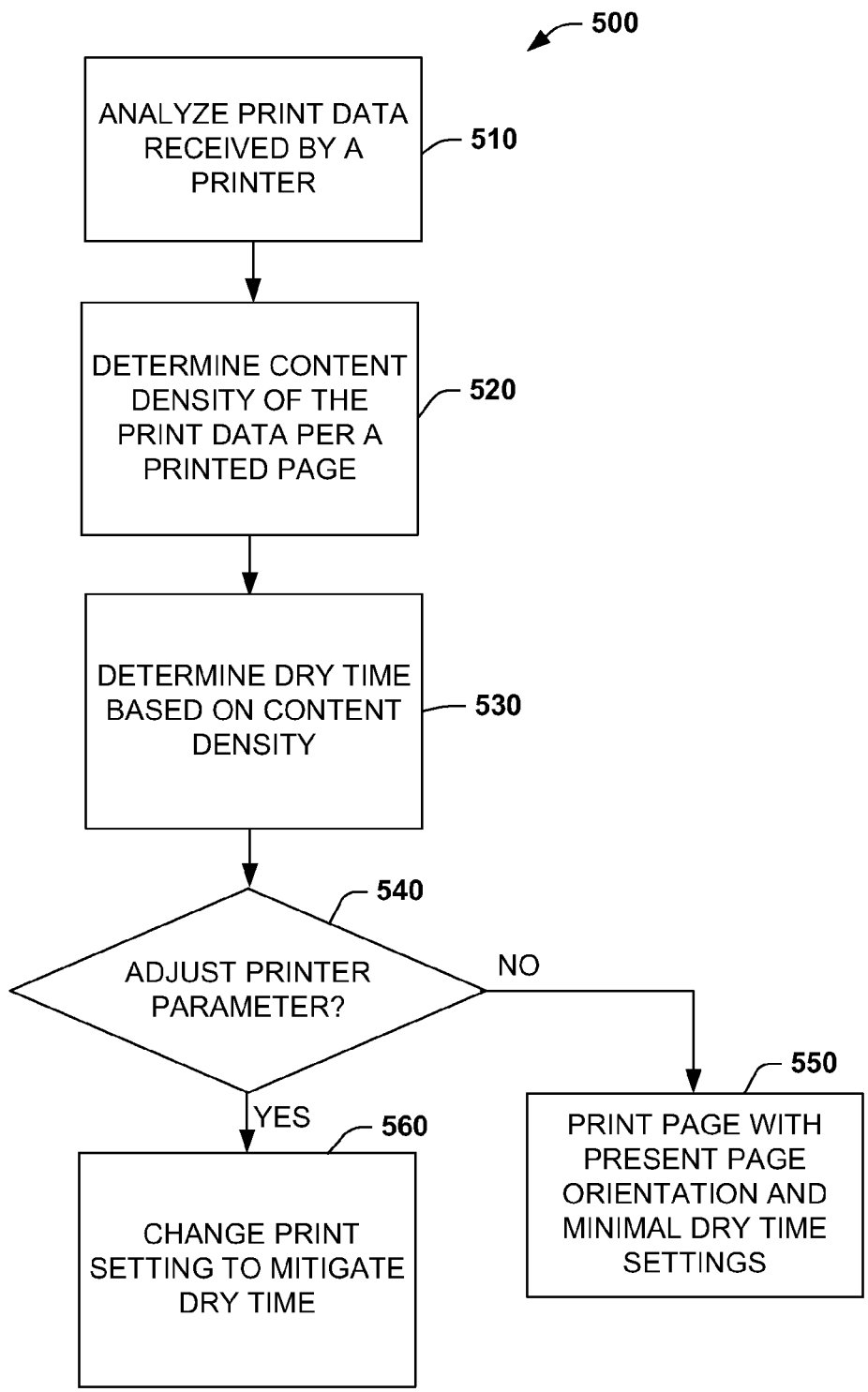
FIG. 5 illustrates a flowchart of an example method for managing printer dry time.

FIG. 5 illustrates an example method 500 for managing printer dry times. It is noted that such method 500 can be automatically executed by one or more computer systems, such as a microprocessor-based printer. At 510, the method 500 includes analyzing print data received by a printer (e.g., the printer 110 of FIG. 1). At 520, the method includes determining content density of the print data per a printed page (e.g., computed by density calculator 120 of FIG. 1). At 530, the method includes determining dry time based on the content density or other environmental factors. At 540, a decision is made for adjusting a variable print parameter based on the content density. At 550, if no parameter change is desired at 540, the page is printed with present page orientation and corresponding dry time settings. At 560, if parameter changes are desired at 540, a variable printer parameter is changed (e.g., by controller 140 of FIG. 1), such as page orientation or other variable print setting, to mitigate dry time.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. Additionally, the term "based on" means based at least in part on. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A printer comprising:
a density calculator to determine a content density of data on page to be printed; and
a controller to:
receive the content density and at least one environmental variable;
determine a dry time for each swath of the page to be printed based on the content density and the at least one environmental variable;
adjust a page orientation and a print head speed for the page to be printed to mitigate a drying time of the page to be printed based on the dry time determined for each swath.

2. The printer of claim 1, wherein the page orientation is adjusted by a 0 degree rotation, a 90 degree rotation, a 180 degree rotation, or a 270 degree rotation.

3. The printer of claim 1, wherein the controller adjusts a paper feed delay to further mitigate the drying time.

4. The printer of claim 1, wherein the density calculator determines the content density for an amount of ink to be employed per swath of travel of an ink head.

5. The printer of claim 1, wherein the page to be printed is printed with the adjusted page orientation with the drying time mitigated.

6. The printer of claim 1, wherein the density calculator determines another content density of data on another page to be printed; and
the controller determines another drying time for the another page to be printed based on the another content density and adjusts another page orientation of the another page to be printed to mitigate the another drying time.

7. The printer of claim 1, wherein for another page to be printed, the density calculator to determine another content density of data on the another page to be printed.

8. The printer of claim 7, wherein the controller readjusts the page orientation and the print head speed for the another page to be printed.

9. The printer of claim 7, wherein the another content density of the another page to be printed is different from the content density of the page to be printed.

10. A method, comprising:
analyzing, by a processor, print data received by a printer, the print data with a first page orientation;
determining, by the processor, a content density of the print data on a page to be printed;
determining, by the processor, a dry time for each swath of the page to be printed based on the content density and an environmental variable; and
adjusting, by the processor, the first page orientation to a second page orientation and adjusting a print head speed variable to control a drying time of the page to be printed based on the dry time determined for each swath.

11. The method of claim 10, further comprising causing, by the processor, the print data to be printed by the printer with the second page orientation with the drying time controlled.

12. The method of claim 10, further comprising:
analyzing, by the processor, additional print data received by the printer, the additional print data with a third page orientation;
determining, by the processor, another content density of the additional print data on another page to be printed;
determining, by the processor, another drying time for the additional print data on the another page to be printed based on the another content density; and
changing, by the processor, the third page orientation to a fourth page orientation based on the another content density to minimize the drying time.

13. The method of claim 12, further comprising causing the second page to be printed at the fourth page orientation after the printed page is printed to mitigate the dry time of the printed page.

14. The method of claim 10, further comprising determining, by the processor, another content density of print data on another page to be printed.

15. The method of claim 14, further comprising readjusting, by the processor, the page orientation and the print head speed based on the another content density calculated for the another page to be printed.

16. A system, comprising:
a memory for storing computer executable instructions associated with a computer; and
a processing unit for accessing the memory and executing the computer executable instructions, the computer executable instructions comprising:
instructions to provide a content density computation for a printed page, wherein the content density computation includes data for an amount of ink to be employed per swath of travel of an ink head on the printed page required to print content;
instructions to determine a dry time for each swath of the printed page based on the content density and an environmental variable; and
instructions to adjust a page orientation and a print head speed for the printed page to mitigate the drying time for the printed page based on the drying time determined for each swath.

17. The system of claim 16, wherein the computer executable instructions comprise:
instructions to adjust at least one of a swath speed or a paper feed delay based on the content density to further mitigate the drying time.

18. The system of claim 16, wherein the instructions to provide the content density computation further provide another content density calculated for another printed page.

19. The system of claim 18, wherein the instructions to adjust the page orientation and the print head speed readjust the page orientation and the print head speed based on the another content density calculated for the another page to be printed.

20. The system of claim 18, wherein the another content density of the another page to be printed is different from the content density of the page to be printed.

* * * * *